(12) United States Patent
Paul et al.

(10) Patent No.: US 10,660,416 B2
(45) Date of Patent: May 26, 2020

(54) WHEEL ARRANGEMENT FOR A SUITCASE

(71) Applicant: VICTORINOX AG, Ibach (CH)

(72) Inventors: Tillman Paul, Stoos (CH); Carsten Kulcke, Schwyz (CH); Max Toma, Thun (CH); Michel Perret, Steffisburg (CH)

(73) Assignee: VICTORINOX AG, Ibach (CH)

( * ) Notice: Subject to any disclaimer, the term of this patent is extended or adjusted under 35 U.S.C. 154(b) by 241 days.

(21) Appl. No.: 15/548,169

(22) PCT Filed: Feb. 25, 2016

(86) PCT No.: PCT/EP2016/053958
§ 371 (c)(1),
(2) Date: Aug. 2, 2017

(87) PCT Pub. No.: WO2016/135232
PCT Pub. Date: Sep. 1, 2016

(65) Prior Publication Data
US 2018/0027936 A1 Feb. 1, 2018

(30) Foreign Application Priority Data
Feb. 26, 2015 (EP) .................................... 15156749

(51) Int. Cl.
*A45C 5/03* (2006.01)
*A45C 5/02* (2006.01)
(Continued)

(52) U.S. Cl.
CPC .................. *A45C 5/03* (2013.01); *A45C 5/02* (2013.01); *A45C 5/14* (2013.01); *A45C 13/262* (2013.01);
(Continued)

(58) Field of Classification Search
CPC .. A45C 5/14; A45C 5/03; A45C 13/36; B62B 2301/04; B62B 2301/044; B60B 33/00
See application file for complete search history.

(56) References Cited

U.S. PATENT DOCUMENTS

| 4,385,415 | A |   | 5/1983 | Volz |
| 5,350,151 | A | * | 9/1994 | Aoki ...................... A47B 91/04 248/188.3 |

(Continued)

FOREIGN PATENT DOCUMENTS

| CN | 201223080 Y | 4/2009 |
| CN | 103079423 A | 5/2013 |

(Continued)

OTHER PUBLICATIONS

Written Opinion of the International Searching Authority of PCT/EP2016/053958 dated May 11, 2016.
(Continued)

*Primary Examiner* — James A Shriver, II
*Assistant Examiner* — Steve Clemmons
(74) *Attorney, Agent, or Firm* — Sughrue Mion, PLLC

(57) ABSTRACT

A piece of luggage (1) comprising a housing (2) and at least one pair of caster wheels (9), wherein each of the caster wheels (9) comprises a swivel axis (S) and at least one wheel (10) with a peripheral surface (11) rotating around a rotation axis (R) running perpendicular to the swivel axis (S). The diameter (D) of the at least one wheel (9) is as large as possible under the provision that in a rotational position parts of the peripheral surface (10) of the wheel (9) extend in a space between a center plane (C) extending centrally between a front wall (3) and a back wall (4) and a reference plane (P) extending parallel and at a distance (A) to the center plane (C), which distance (A) amounts up to 20% of the diameter (D) of the wheel (9).

16 Claims, 5 Drawing Sheets

(51) Int. Cl.
*A45C 13/36* (2006.01)
*A45C 5/14* (2006.01)
*A45C 13/26* (2006.01)
*B29C 51/08* (2006.01)
B29K 23/00 (2006.01)
B29K 55/02 (2006.01)
B29K 69/00 (2006.01)
B29L 31/00 (2006.01)

(52) U.S. Cl.
CPC .............. *A45C 13/36* (2013.01); *B29C 51/08* (2013.01); *A45C 2005/037* (2013.01); *A45C 2013/267* (2013.01); *B29K 2023/12* (2013.01); *B29K 2055/02* (2013.01); *B29K 2069/00* (2013.01); *B29L 2031/7418* (2013.01)

(56) References Cited

U.S. PATENT DOCUMENTS

| | | | | |
|---|---|---|---|---|
| 5,950,779 | A * | 9/1999 | Miyoshi | A45C 13/262 190/112 |
| 5,992,588 | A * | 11/1999 | Morszeck | A45C 5/14 190/18 A |
| 8,118,146 | B2 * | 2/2012 | Shalgi | A45C 5/03 16/47 |
| 9,066,565 | B2 * | 6/2015 | Farrelly | A45C 5/14 |
| 9,894,970 | B2 * | 2/2018 | Sheikh | A45C 5/06 |
| 9,914,327 | B2 * | 3/2018 | Mangano | B60B 33/00 |
| 9,961,974 | B2 * | 5/2018 | Hillaert | A45C 5/14 |
| 9,968,170 | B2 * | 5/2018 | Morszeck | A45C 5/02 |
| 2005/0144755 | A1 * | 7/2005 | Miyoshi | A45C 5/14 16/35 R |
| 2009/0166141 | A1 * | 7/2009 | Davis | A45C 5/14 190/18 A |
| 2011/0168507 | A1 * | 7/2011 | Penley | A45C 5/14 190/18 A |

FOREIGN PATENT DOCUMENTS

| | | | |
|---|---|---|---|
| CN | 103799652 A | 5/2014 | |
| DE | 202013100277 U * | 3/2014 | ........... B60B 33/045 |
| DE | 20 2013 100 277 U1 | 4/2014 | |
| EP | 0 874 564 B1 | 3/2002 | |
| EP | 2 730 190 B1 | 5/2014 | |
| GB | 930926 A * | 7/1963 | ............... A45C 3/04 |

OTHER PUBLICATIONS

International Search Report of PCT/EP2016/053958 dated May 11, 2016.

Communication dated Jul. 11, 2018, issued by the State Intellectual Property Office of the People's Republic of China in counterpart Chinese Application No. 201680009033.X.

* cited by examiner

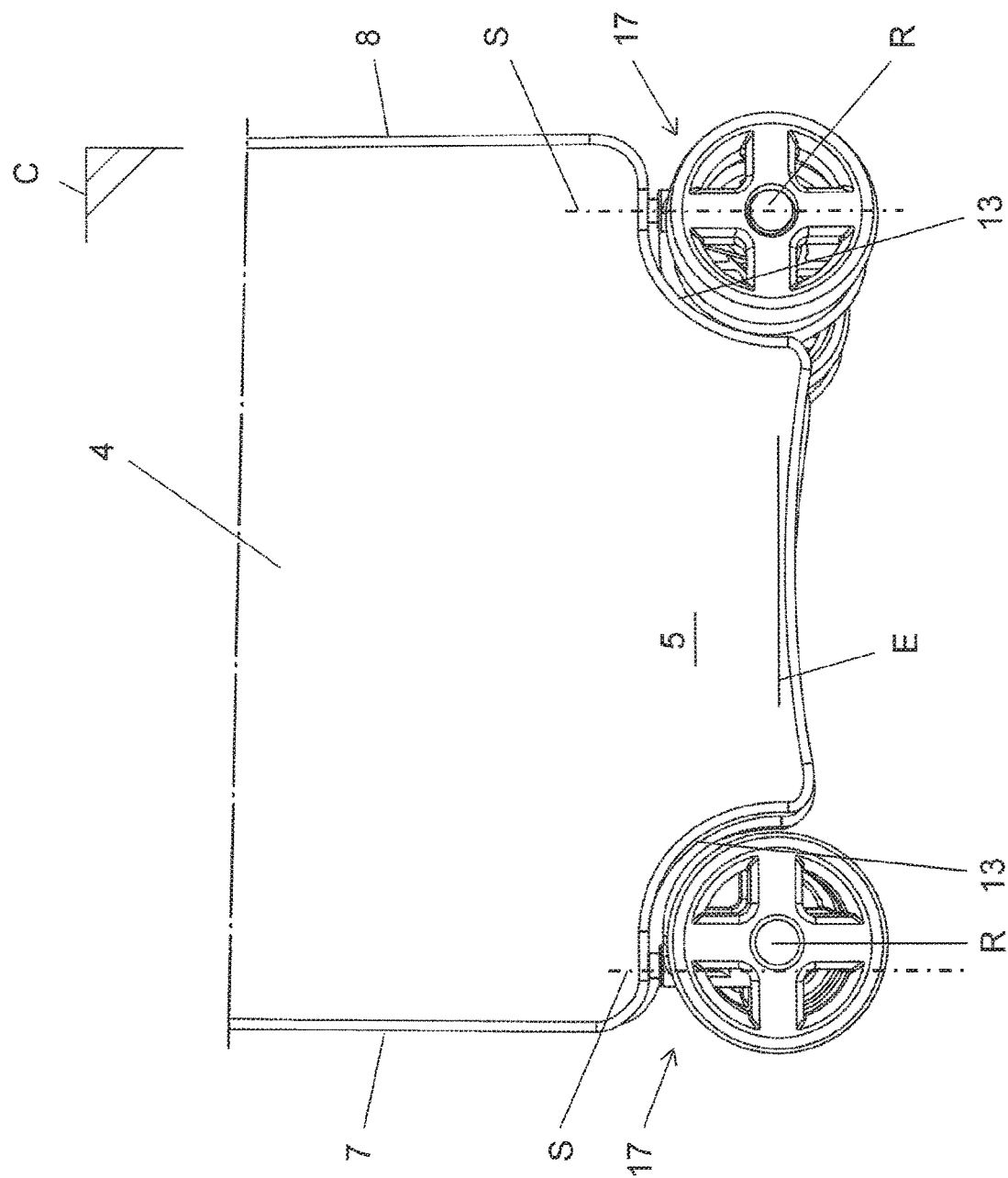

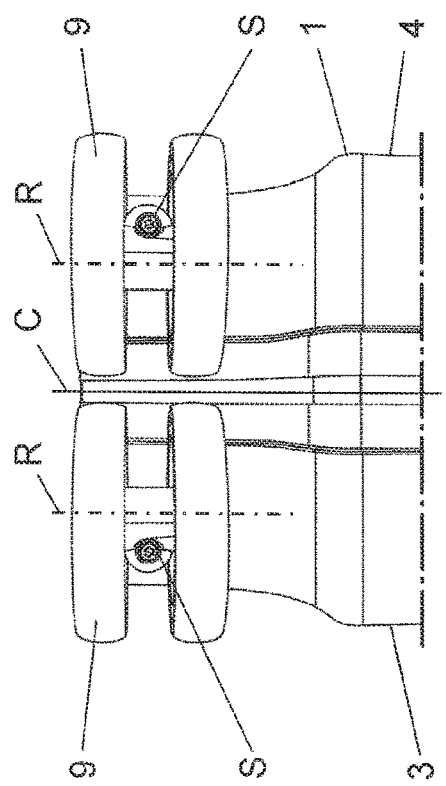
FIG. 6
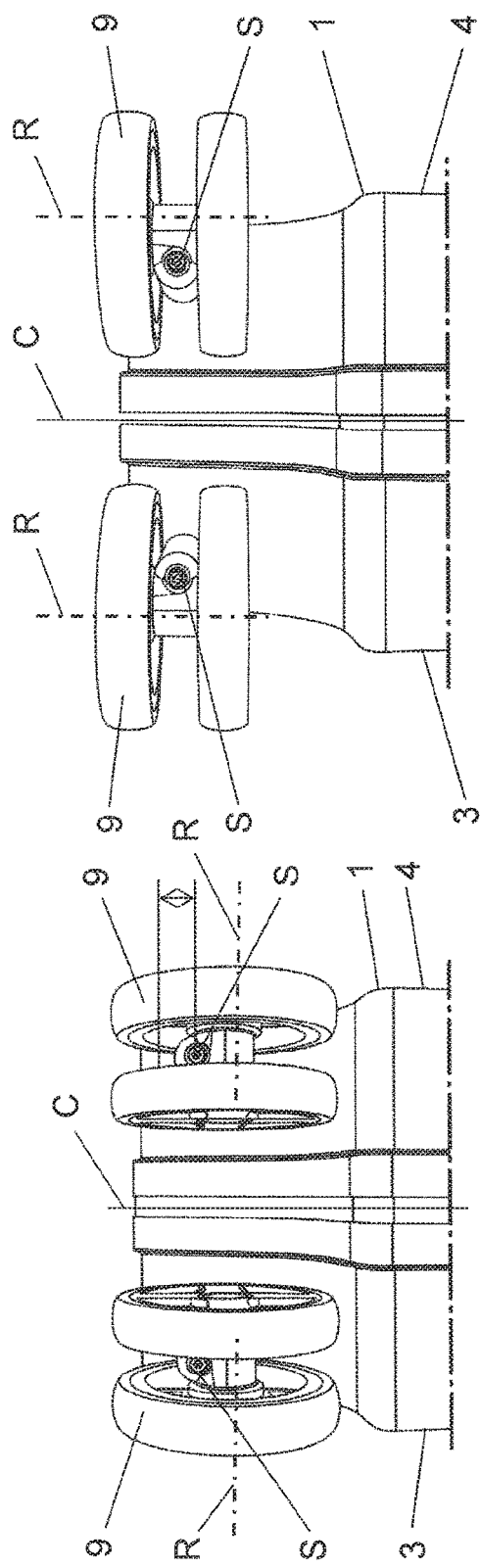
FIG. 7
FIG. 8

WHEEL ARRANGEMENT FOR A SUITCASE

CROSS REFERENCE TO RELATED APPLICATIONS

This application is a National Stage of International Application No. PCT/EP2016/053958 filed Feb. 25, 2016, claiming priority based on European Patent Application No. 15 156 748.4 filed Feb. 26, 2015 and European Patent Application No. 15 156 749.2 filed Feb. 26, 2015, the contents of all of which are incorporated herein by reference in their entirety.

TECHNICAL FIELD

The present invention relates to a piece of luggage with enhanced caster wheels.

PRIOR ART

From prior art pieces of luggage having caster wheels are known. For example U.S. Pat. No. 4,385,415 shows a caster wheel arrangement in which each of the caster wheels are arranged in a housing that is connected to the suitcase.

EP 0 874 564 shows a further example of a suitcase which has enhanced properties in terms of its resistance against being tilted when moved.

However, the pieces of luggage as known from prior art have the drawback that despite their enhanced features the pieces of luggage are not favorable when it comes to a movement on uneven or blocked surfaces.

SUMMARY OF THE INVENTION

It is an object of the invention to provide a piece of luggage that has enhanced rolling properties in particular when it comes to movement on uneven or blocked surfaces.

Accordingly a piece of luggage comprises a housing and at least one pair of caster wheels. Said housing having a front wall, a back wall, a top wall, a bottom wall and side walls. The front wall and the back wall form major faces of the housing, wherein said side walls form side faces of the housing and extend between the front wall and the back wall. The top wall and the bottom wall forming top and bottom ends of the housing and extend between the front wall and the back wall. Each of said caster wheels comprises a swivel axis and at least one wheel with a peripheral surface rotating around a rotation axis which rotation axis runs perpendicular to said swivel axis. Said pair of caster wheels is arranged proximate to the bottom end of the housing. The diameter of said at least one wheel is as large as possible under the provision that in a rotational position parts of the peripheral surface of the wheel extend in a space between a center plane extending centrally between said front wall and said back wall and a reference plane extending parallel and at a distance to said center plane. The distance between the center plane and the reference plane amounts up to 30% of the diameter of said wheel, in particular up to 20% or up to 10% of the diameter of said wheel. Alternatively said distance between the center plane and the reference plane amounts up to 25% of the distance between the front wall and the back wall, in particular up to 20% or 10% of the distance between the front wall and the back wall. The distance between the front wall and the back wall is preferably defined as being the distance in perpendicular direction with regard to the back wall or the front wall. In a further alternative the distance is defined as being the distance between the center plane and the reference plane that extends—as seen from said central plane—through the outermost parts of a longitudinal closure element extending between said caster wheels. In this further alternative the reference plane extends through said outermost parts of said longitudinal closure element.

The diameter of the at least one wheel as described and defined above has the advantage that it is with regard to the size of the piece of luggage enhanced and therefore the movement on uneven or blocked surfaces can be improved.

Preferably exactly two wheels having the same diameter are arranged at one caster wheel. Said two wheels are arranged at a distance as seen along the rotation axis such that an interspace is provided between said two wheels, wherein the swivel axis extends into said interspace. Furthermore the swivel axis comprises a bearing section in which said rotation axis is mounted.

Preferably the parts of the peripheral surface extending in said space are defined as being the parts that are—in said rotational position—the parts of the peripheral surface or the wheel that are the closest parts to the center plane.

In a preferred variant the wheel in its rotational position does not cross or does not contact said center plane. Therefore it is preferable the there is a small gap between the peripheral surface and the center plane in the rotational position. This has the effect that the two caster wheels of said pair of caster wheels can rotate without hindering each other.

Alternatively it may also be possible that the wheel contacts or crosses said plane under the provision as stated above. This enhances the wheel properties further, but may lead in certain positions to a collision of the wheels.

Preferably in said rotational position the wheel is swiveled around the swivel axis such that the rotation axis of the wheel is angularly tilted such that the rotation axis does not extend perpendicular to said center plane.

Even more preferably the angle of said tilt between the rotation axis and the center plane is in the range of 0° to 45° or the angle of said tilt between the rotation axis and the center plane is 0° such that the rotation axis runs parallel to the center plane.

Preferably said rotational position the rotation axis of the wheel lies between the swivel axis and the center plane. In this position parts of the peripheral surface extend in the space between the center plane and the reference plane. However, in case the wheel is swiveled such that the rotation axis is closer to the front wall or the back wall than to the center plane the peripheral surface may not be in the region between the center plane and the reference plane.

Preferably the bottom wall extends as seen from the bearing point at which said swivel axis intersects with the bottom wall with a curved surface partly around said wheel. Said curved surface provides a cavity and therefore the caster wheels are positioned in this cavity and are embedded in said housing. In other words: The bottom wall extends as seen from the side wall with said curved surface whereby the curvature extends around an axis which runs perpendicular from the front wall to the back wall.

Preferably the curved surface extends with substantially the same or a substantially constant cross-section from the back wall to the front wall such that a non-interrupted space between the back wall and the front wall can be provided. In this space the caster wheels are arranged. The term non-interrupted space is to be understood as being a space in which no parts of the housing extends or no parts of the closure element as mentioned below extends. In said non-interrupted space the caster wheels can freely swivel around their swivel axis.

Preferably the longitudinal closing element as mentioned below extends over said curved surface between said two neighbouring caster wheels. Hence the closing element is arranged such that it does not hinder the swivel movement of the caster wheels. The caster wheels can therefore swivel also in the region in which said longitudinal closure element is arranged.

Preferably the curved surface extends at least to a plane extending through the rotation axis and perpendicular to said center plane or underneath a plane extending through the rotation axis and perpendicular to said center plane. This has the effect that the volume can be enhanced.

Alternatively the curved surface can also provide a sphere-like recess in which the caster wheel can freely rotate. In particular for one caster wheel one sphere-like recess is provided.

Preferably the swivel axis and the rotation axis are oriented perpendicular and displaced with each other. Therefore no intersection between the swivel axis and the rotation axis is present.

Preferably the distance of the displacement of the swivel axis to the rotation axis is smaller than half of the diameter of said wheel.

The swivel axis is preferably arranged at a distance to the front wall and/or to the back wall and/or at a distance to the sidewall. Said distances are preferably smaller than half or a quarter of the diameter of the wheel.

Preferably the swivel axis is arranged in a region between said front wall or said back wall and a virtual plane extending centrically between said center plane and said front wall or said back wall.

Preferably the swivel axis is oriented parallel to the front wall and the back wall as well as to the side wall.

Preferably two pairs of caster wheels are arranged, wherein one of said two pairs is arranged proximate to one of the sidewalls and the other of said two pairs is arranged proximate to the other of said sidewalls.

Preferably the bottom wall is curved in a concave manner between two pairs of caster wheels. Thereby the mechanical stability of the bottom wall can be enhanced.

Preferably the sidewalls, the top wall and the bottom wall are separated by means of a longitudinally extending closure element such as a zipper. The closure element extends preferably substantially fully around the circumference as defined by the sidewalls, the top wall and the bottom wall. Further in case said curved surface is present the longitudinal closure element extends along said curved surface.

Preferably the closure element is arranged centrically between said swivel axes of said caster wheels of said pair of caster wheels. In case the curved surface is present the closure element extends also along said curved surface.

Preferably said closure element extends substantially in said center plane.

Preferably the diameter of the wheel is in the range of 40 to 120 Millimeters, in particular 65 or between 65 and 100 Millimeters.

Preferably the projection amount of the wheel relative to the sidewall or the front wall or the back wall amounts up to the distance between the swivel axis and the center plane.

Preferably the swivel axis is mounted to the housing via a bearing point which is firmly attached to the housing or which is an integral part of the housing.

Preferably the back wall and the front wall extend parallel at a distance to each other. Further preferably the bottom wall and the top wall extend parallel at a distance to each other, whereby the bottom wall and the top wall extend perpendicular to the back wall and the front wall. The side walls extend also parallel at a distance to each other, whereby the side walls extend perpendicular to the back wall and the front wall. In other words: the housing has preferably a substantial cuboidic shape.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 4 shows a side view on the front side of the piece of luggage according to FIG. 1; and FIGS. 5 to 8 show bottom views of the piece of luggage according to FIG. 1.

DESCRIPTION OF PREFERRED EMBODIMENTS

Figure 1:
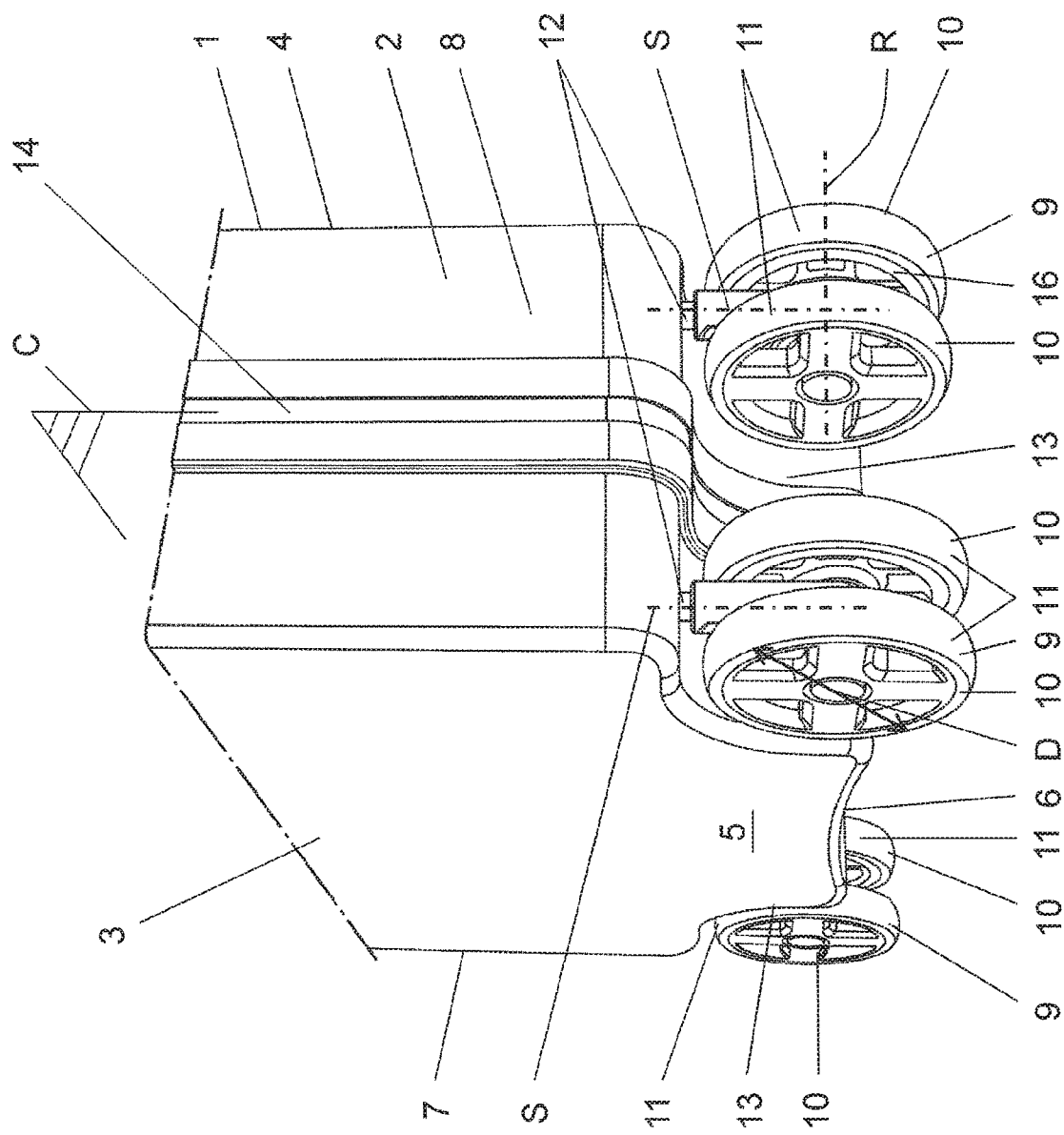
FIG. 1 shows a perspective detailed view of a piece of luggage having caster wheels according to one embodiment of the present invention.

FIG. 1 shows a perspective view of a piece of luggage 1. The piece of luggage 1 comprises a housing 2 and at least one pair of caster wheels 9. A pair of caster wheels 9 comprises two caster wheels 9.

In the present embodiment of the piece of luggage two pairs of caster wheels 9 are arranged. Therefore the piece of luggage can be moved on said two pairs of caster wheels 9.

The housing 2 of the piece of luggage 1 comprises a front wall 3, a back wall 4, a top wall, a bottom wall 6 and side walls 7, 8. The top wall is not shown in the figures. The front wall 3 and the back wall 4 form major faces of the housing 2, wherein the side walls 7, 8 form side faces of the housing 2 and extend between the front wall 3 and the back wall 4. The top wall 5 and the bottom wall 6 provide top and bottom ends of the housing 2 and extend between the front wall and the back wall 4. The side walls 7, 8 are also in connection with the bottom wall 6 and the top wall. The housing 2 limits an inner space in which the user can place the items to be carried.

The pair of caster wheels 9 comprises two caster wheels 9. One of the caster wheels 9 is arranged in proximity of the front wall 3 and the other of the caster wheels 9 is arranged in proximity of the back wall 3. One of the pairs of the caster wheels 9 is arranged in proximity of one of the side walls and the other of the caster wheels 9 is arranged in proximity of the other of the side walls.

Each of said caster wheels 9 comprises a swivel axis S and at least one wheel 10 with a peripheral surface 11. Said at least one wheel 10 rotates around a rotation axis R which rotation axis R runs perpendicular to said swivel axis S. The wheel 10 is thereby in contact with the ground on which the piece of luggage 1 moves with the peripheral surface 11. The peripheral surface 11 extends around the rotation axis R and defines the diameter D of the wheel 10.

In the present embodiment each of the caster wheels 9 comprises two wheels 10. The two wheels 10 are arranged at a distance to each other such that an interspace 16 is provided between said two wheels 10. In said interspace the swivel axis S extends and the rotation axis R is in connection with the swivel axis S.

In the present embodiment the swivel axis S penetrates the bottom wall 6 and is beared in a bearing point 12. The bearing point 12 is part of the housing 2.

The wheels 10 swivel, or pivot, respectively, around the swivel axis S. When the piece of luggage is being moved the wheels 10 rotate around the rotation axis R and swivel/pivot around the swivel axis S in case the direction of movement changes.

Figure 3:
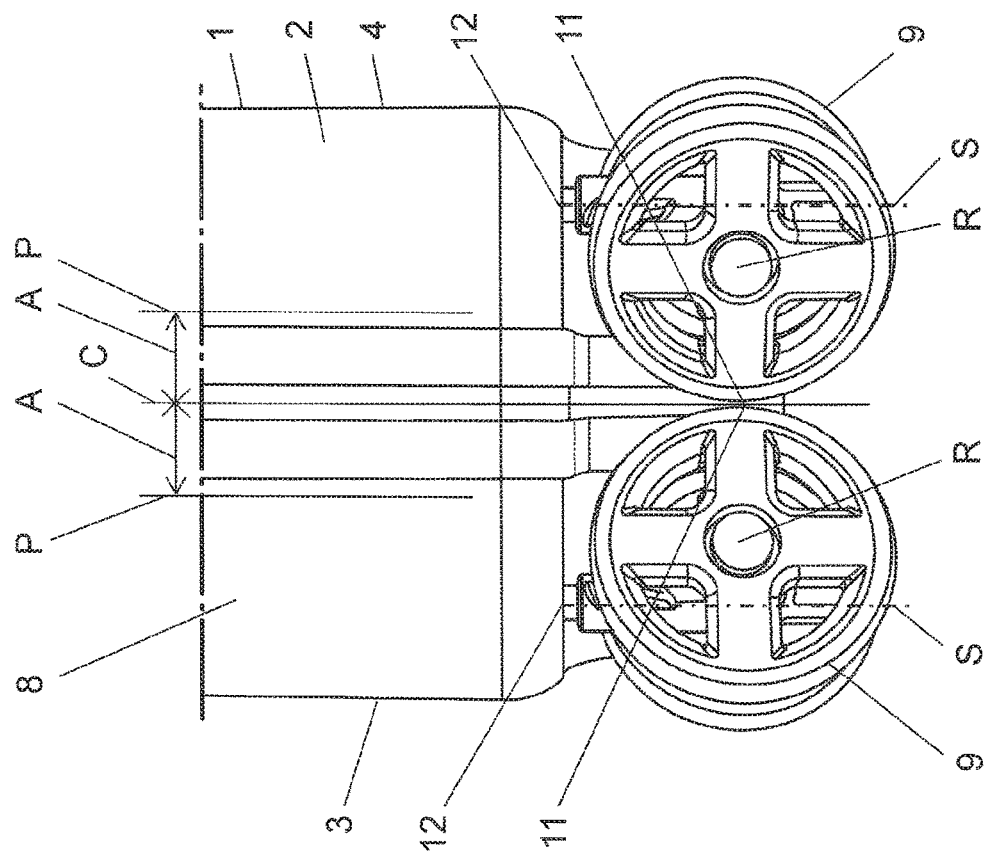
FIG. 3 shows a plan view on the side surface of the piece of luggage according to FIG. 1.
Figure 2:
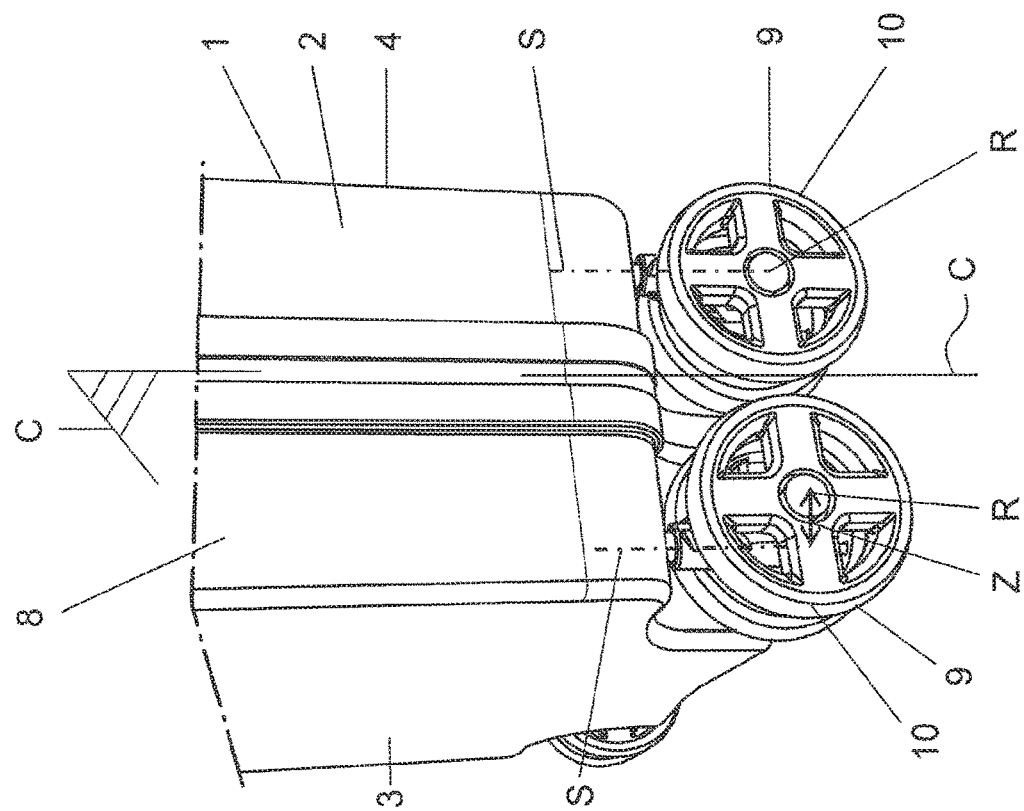
FIG. 2 shows a further perspective view of the piece of luggage according to FIG. 1, wherein the caster wheels are in a rotational position.

FIGS. 2 to 4 show further perspective of the piece of luggage 1 according to the invention, whereby the wheels 10 are shown in different positions.

With the aid of FIGS. 5 to 8 the configuration of the diameter D of the caster wheels 9 is explained in the following.

The diameter D of said at least one wheel 9 is as large as possible under the provision that in a rotational position parts of the peripheral surface 10 of the wheel 9 extend in a space between a center plane C extending centrally between said front wall 3 and said back wall 4 and a reference plane P extending parallel and at the distance to said center plane C. The distance between the center plane C and the reference plane P is designated with A. In the rotational position parts of the peripheral surface 10 extend into the region between plane C and plane P. These parts can be seen in FIG. 5, in which at one wheel said part is indicated by a hatched area 18. The distance A between the center plane C and the reference plane P amounts up to 25% of the diameter D of said wheel 10. In a preferred embodiment the distance A amounts up to 20% or up to 10% of the diameter of said wheel 10.

In an alternative definition the distance A between the center plane C and the reference plane P amounts up to 25% of the distance between the front wall 3 and the back wall 4, in particular up to 20% or 10% of the distance between the front wall 3 and the back wall 4. The distance between the front wall 3 and the back wall 4 is defined as being the distance in perpendicular direction.

In a further alternative definition the distance A is defined as being the distance between the center plane C and the reference plane P that extends through the outermost parts as seen from said central plane C of a longitudinal closure element 14 extending between said caster wheels 9. The outermost parts of said longitudinal closure element 14 are designated with reference numeral 19.

Figure 5:
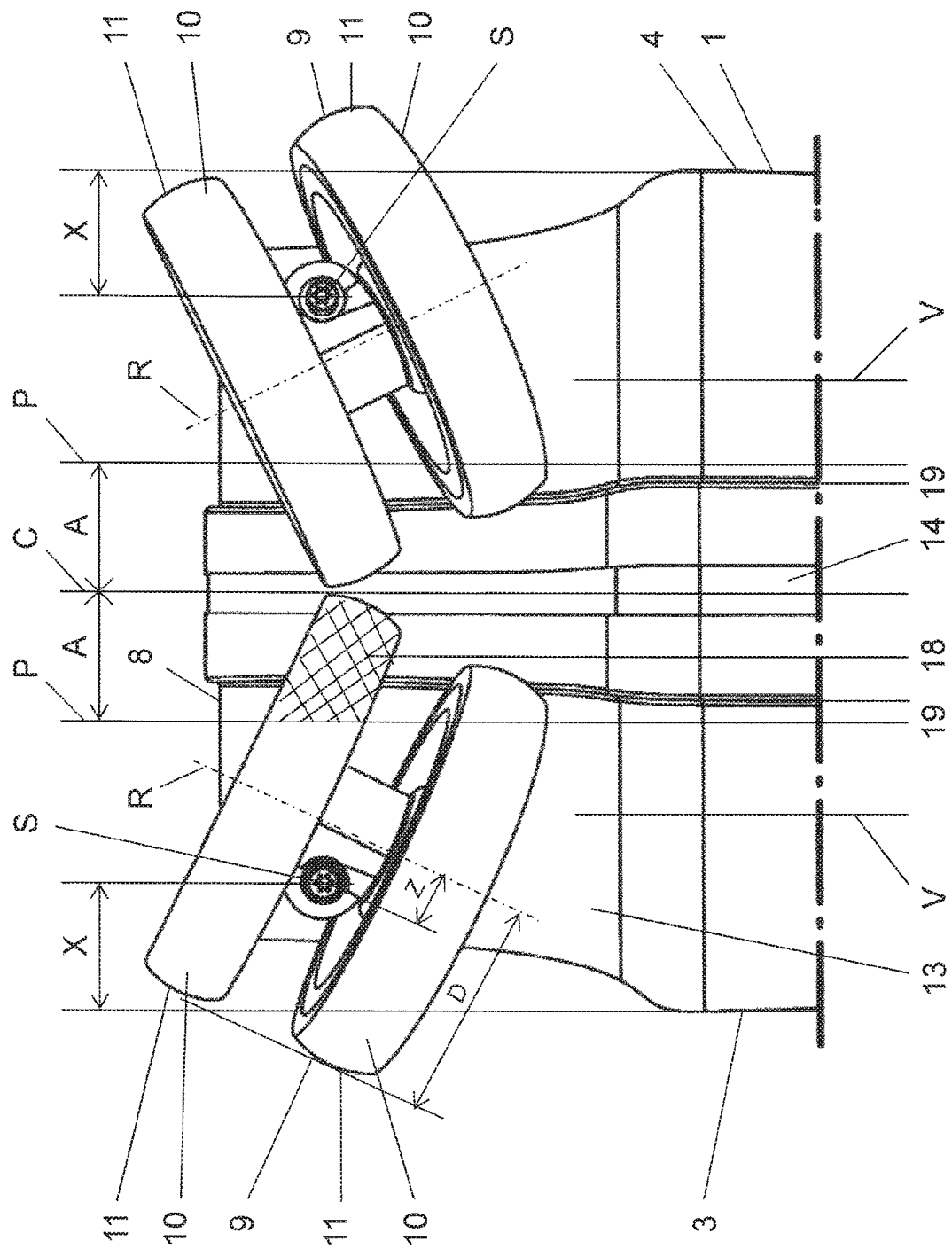

In said rotational position the caster wheel 9 is swiveled around the swivel axis S such that the rotation axis R of the wheel 9 is angularly tilted such that the rotation axis R does not extend perpendicular to said center plane C. In particular the rotational position is defined such that the angle between the rotation axis and the center plane C is in the range of 0° to 45°. Furthermore particularly the rotational position is defined such that the rotation axis R runs parallel, i.e. with 0°, to the center plane C. In the rotational position as it is shown in FIGS. 5 and 6 the rotation axis R is angularly swivelled with an angle between 0° and 45°. In FIG. 5 the angle is roughly 45° and in FIG. 6 the angle is 0°.

In other words: In the rotational position the rotation axis R of the wheel 10 is angularly swiveled such that the rotation axis R does not extend perpendicular, but angularly tilted, to said center plane C.

Preferably said rotational position the rotation axis R of the wheel 10 lies between the swivel axis S and the center plane C. In this position parts 18 of the peripheral surface 11 extend in the space between the center plane C and the reference plane P. However, in case the wheel 10 is swiveled such that the rotation axis R is closer to the front wall 3 or the back wall 4 the peripheral surface 11 may not be in the region between the center plane C and the reference plane P. Such a position is shown in FIG. 8.

As it can be seen from FIG. 5 it is preferable that the wheel 9 in said rotational position does not cross or does not contact said center plane C. This means that it is preferable that in the rotational position the outer most parts of the peripheral surface 10 extends just to the center plane C but not over the center plane C. With such a diameter a collision of the two wheels can be excluded at any discretionary swivel position. In an alternative embodiment the wheel 9 may also cross the center plane C. However this embodiment is not shown in the figures and has the drawback that under certain circumstances a collision of the wheels 10 of a pair of caster wheels 9 cannot be avoided. However, this embodiment has the advantage that the diameter D can be chosen even larger.

The swivel axis S is arranged at a distance Y to the front wall 3 and/or to the back wall 4. Furthermore the swivel axis S is arranged at a distance Y to the side walls 7, 8. The swivel axis S is oriented parallel to the center plane C and the front wall 3 or the back wall 4 as well as to the sidewalls 8, 9. The distances X, Y are smaller than half or a quarter of diameter D of the wheel 10. It is preferable that the distances X, Y are as small as possible.

Preferably or alternatively the swivel axis S is arranged in a region between the front wall 3 or the back wall 4 and a virtual plane V extending centrically between the center plane C and the front wall 3 or the back wall 4.

In the present embodiment, as it can be seen from FIG. 4, in particular two pairs of caster wheels 9 are arranged. One of said pairs of caster wheels 9 is arranged proximate to one of the side walls 7 and the other of said pairs of caster wheels 9 is arranged proximate to the other side wall 8. This means that the piece of luggage 1 stands on four caster wheels 9. Each of the caster wheels 9 has, as explained above, in the present embodiment two wheels 10 which are connected with each other through the rotation axis R.

The bottom wall 6 extends as seen from the bearing point 12 at which said swivel axis S intersects the bottom wall 6 with a curved surface 13 partly around said wheel 10. The curved surface 13 provides a recess in which the caster wheels 9 are placed. Thereby the volume of the piece of luggage 1 can be enhanced as the housing 2 extends in a region between the two pairs of caster wheels 9. This region is shown in FIG. 4 with the reference numeral 5. This curved surface 13, which is in fact a part of the bottom wall 6 provides links the rest of the bottom wall 6 with the side wall 7, 8.

The curved surface 13 extends at least to a plane E or under said plane E. The plane E is defined as extending through the rotation axis R of the caster wheels 9 and perpendicular to said center plane C. In the present embodiment parts of the curved surface 13 extend under said plane as seen from the main part of the housing 2.

The curved surface 13 extends substantially with the same cross action from the back wall 4 to the front wall 3. Thereby a curved space 17 is provided in which said caster wheel 9 can freely rotate. With other words the curved surface 13 extends around an axis which runs perpendicular to the front wall 3 and the back wall 4. Said axis is preferably collinear with the rotation axis R in case the rotation axis R runs perpendicular to the front wall 3 and the back wall 4.

In the preferred embodiment as shown in FIG. 4 the bottom wall 6 between said curved surfaces 13 that extend from the side walls 7, 8 is further curved. The curvature is designed with reference sign 15. Thereby the bottom wall 6 is curved with curvature 15 in a concave manner between the two pairs of caster wheels 9. This has the advantage that the ground clearance between a ground on which the piece of luggage 1 stands with the peripheral surface 11 and the bottom wall can be enhanced under the provision of maximising the volume. In this embodiment the bottom wall 6 extends with the curved surface 13 from the side wall 7 which then is adjoined by the curvature 15. The latter is then adjoined by a further curved surface 13 which then is adjoined by the side wall 8.

With regard to FIGS. 1 to 3 further features of the piece of luggage 1 according to the present embodiment will be explained.

The side walls 7, 8, the top wall and the bottom wall 6 are separated by means of a longitudinally extending closure element 14. The closure element 14 can be a zipper. Preferably the longitudinally extending closure element 14 is arranged centrically between the front wall 3 and the back wall 4. Hence it is more or less arranged in said center plane C or it extends centrically between said swivel axis S of said caster wheels 9 of said pair of caster wheels 9.

The swivel axis S and the rotation axis R are oriented perpendicular to each other and are displaced with each other. This can in particular be seen in FIG. 2.

The distance Z of said displacement of the swivel axis S to the rotation axis R is smaller than half of the diameter of said wheel 10.

The invention claimed is:
1. A piece of luggage comprising:
a housing with a front wall, a back wall, a top wall, a bottom wall and side walls, wherein said front wall and said back wall forming major faces of the housing, wherein said side walls forming side faces of the housing and extend between the front wall and the back wall and wherein said top wall and said bottom wall forming top and bottom ends of the housing and extend between the front wall and the back wall; and
at least one pair of caster wheels,
wherein each of said caster wheels comprises a swivel axis and at least one wheel with a peripheral surface rotating around a rotation axis which rotation axis runs perpendicular to said swivel axis,
wherein said at least one pair of caster wheels is arranged proximate the bottom end,
wherein a diameter of each wheel in said at least one pair of caster wheels is as large as possible under the provision that in a rotational position parts of a peripheral surface of the wheel extend in a space between a center plane extending centrally between said front wall and said back wall and a reference plane extending parallel and at a distance to said center plane,
wherein the distance between the center plane and the reference plane is chosen from at least one of:
a first distance which at least amounts up to 30% of the diameter of said wheel,
a second distance which amounts up to 25% of the distance between the front wall and the back wall, and
a third distance which is defined as being a distance between the center plane and the reference plane, which reference plane extends as seen from said central plane through outermost parts of a longitudinal closure element extending between said caster wheels,
wherein the bottom wall extends as seen from a bearing point at which said swivel axis intersects with the bottom wall with a curved surface partly around said wheel,
wherein the sidewalls, the top wall and the bottom wall are separated by means of a longitudinally extending closure element, which longitudinal closure element extends along said walls, and
wherein said longitudinally extending closure element also extends along said curved surface.

2. The piece of luggage according to claim 1, wherein the wheel in said rotational position does not cross or does not contact said center plane.

3. The piece of luggage according to claim 1, wherein in said rotational position the wheel is swiveled around the swivel axis such that the rotation axis of the wheel is angularly tilted to the center plane such that the rotation axis does not extend perpendicular to said center plane.

4. The piece of luggage according to claim 3, wherein the angle of said tilt between the rotation axis and the center plane is in the range of 0° to 45° or wherein the angle of said tilt between the rotation axis and the center plane is 0° such that the rotation axis runs parallel to the center plane.

5. The piece of luggage according to claim 1, wherein the curved surface extends with substantially the same or a substantially constant cross-section from the back wall to the front wall such that a non-interrupted space between the back wall and the front wall can be provided.

6. The piece of luggage according to claim 1, wherein the curved surface extends at least to or underneath a plane extending through the rotation axis and perpendicular to said center plane.

7. The piece of luggage according to claim 1, wherein the swivel axis and the rotation axis are oriented perpendicular and displaced with each other.

8. The piece of luggage according to claim 7, wherein the distance of the displacement of the swivel axis to the rotation axis is smaller than half of the diameter of said wheel.

9. The piece of luggage according to claim 1, wherein the swivel axis is arranged at least one of at a distance to the front wall and to the back wall and at a distance to the sidewall which distances are smaller than half or a quarter of the diameter of the wheel.

10. The piece of luggage according to claim 1, wherein the swivel axis is arranged in a region between said front wall or said back wall and a virtual plane extending centrically between said center plane and said front wall or said back wall.

11. The piece of luggage according claim 1, wherein two pairs of caster wheels are arranged, wherein one of said two pairs is arranged proximate to one of the sidewalls and the other of said two pairs is arranged proximate to the other of said sidewalls.

12. The piece of luggage according to claim 1, wherein the bottom wall is curved in a concave manner between two pairs of caster wheels.

13. The piece of luggage according to claim 1, wherein the longitudinally extending closure element is a zipper.

14. The piece of luggage according to claim 1, wherein said closure element at least one of is arranged centrically or off-center between said swivel axes of said caster wheels of said pair of caster wheels and extends substantially in said center plane.

15. The piece of luggage according to claim 1, wherein the distance between the center plane and the reference plane amounts up to 20% or up to 10% of the diameter of said wheel.

16. The piece of luggage according to claim 1, wherein the distance between the center plane and the reference plane amounts up to 20% or up to 10% of the distance between the front wall and the back wall.

\* \* \* \* \*

UNITED STATES PATENT AND TRADEMARK OFFICE
CERTIFICATE OF CORRECTION

| | | |
|---|---|---|
| PATENT NO. | : 10,660,416 B2 | Page 1 of 1 |
| APPLICATION NO. | : 15/548169 | |
| DATED | : May 26, 2020 | |
| INVENTOR(S) | : Tillman Paul et al. | |

It is certified that error appears in the above-identified patent and that said Letters Patent is hereby corrected as shown below:

On the Title Page

Item [30], Insert:
--Feb. 26, 2015 (EP) ......................15156748.4--

Signed and Sealed this
Twenty-fifth Day of August, 2020

Andrei Iancu
*Director of the United States Patent and Trademark Office*